United States Patent [19]

Huizer et al.

[11] Patent Number: 4,664,223

[45] Date of Patent: May 12, 1987

[54] MULTISENSOR GROUND-FORCE MEASURING MEANS FOR VIBROSEIS

[75] Inventors: Willem Huizer; Jacobus van der Toorn; Gabriel N. M. M. van der Voort, all of Rijswijk, Netherlands

[73] Assignee: Shell Oil Company, Houston, Tex.

[21] Appl. No.: 742,671

[22] Filed: Jun. 7, 1985

[30] Foreign Application Priority Data

Jun. 12, 1984 [GB] United Kingdom ............... 8414907

[51] Int. Cl.$^4$ .............................................. G01V 1/02
[52] U.S. Cl. .................................. 181/113; 181/114; 181/401
[58] Field of Search ............... 367/189, 190; 181/112, 181/113, 114, 121, 401; 73/644, 662

[56] References Cited

U.S. PATENT DOCUMENTS 4,519,053  5/1985  Bedenbender et al. ............ 367/190
4,530,269  7/1985  Rau et al. ............................ 367/173

Primary Examiner—Charles T. Jordan
Assistant Examiner—John W. Eldred

[57] ABSTRACT

Apparatus for measuring the force actually exerted by the base plate of a seismic vibrator on the earth surface is provided. This apparatus consists of a plurality of individual sensor elements, which are arranged on the side of the base plate which is directed towards the earth surface. The sensor elements couple the energy from the base plate to the earth surface.

12 Claims, 3 Drawing Figures

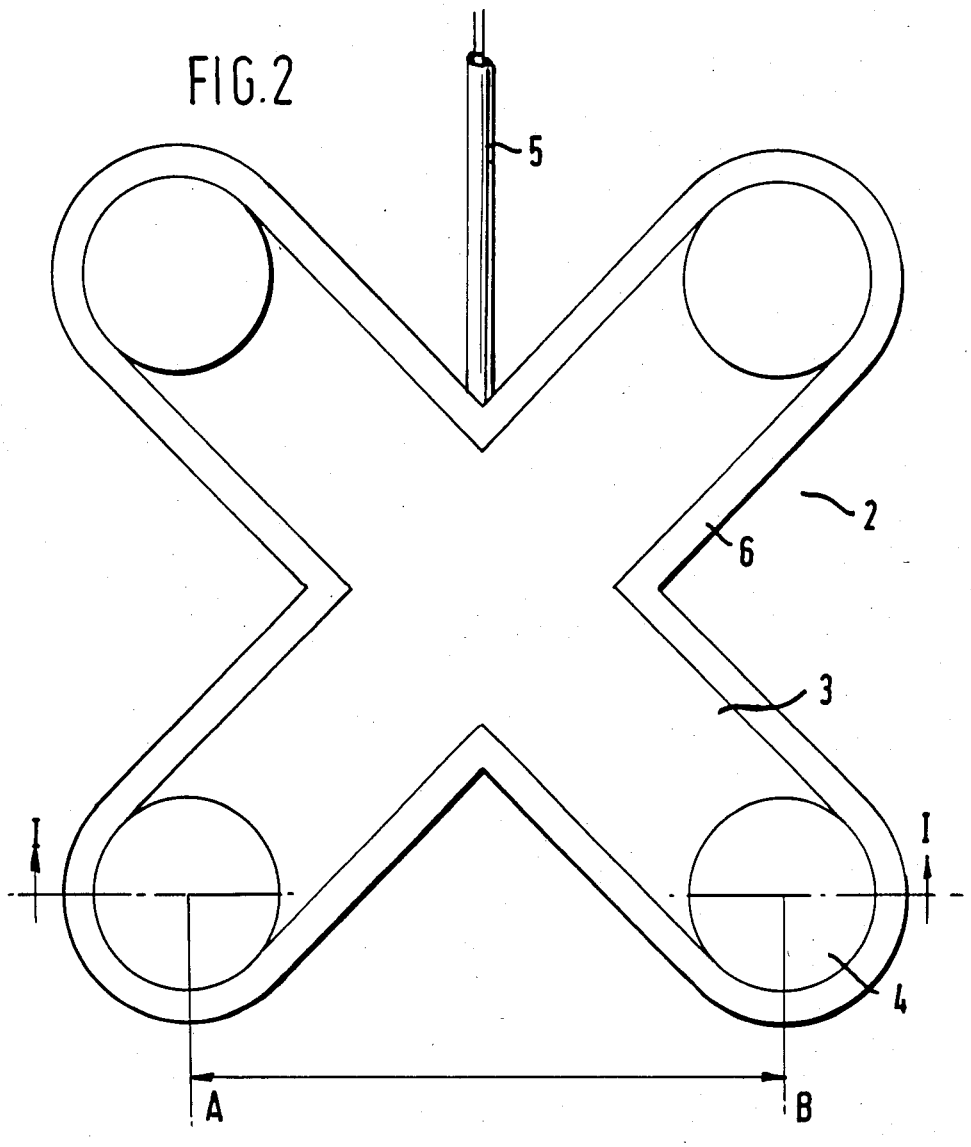
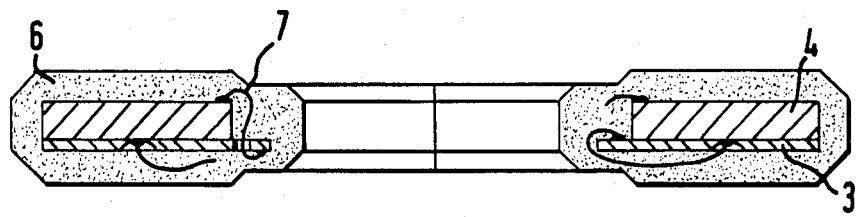
FIGURE 3

MULTISENSOR GROUND-FORCE MEASURING MEANS FOR VIBROSEIS

BACKGROUND OF THE INVENTION

The invention relates to vibratory seismic energy sources used for siesmic prospecting, and more particularly, relates to a means for measuring the actual force that is imparted to the earth surface by a seismic vibrator.

In seismic prospecting vibratory sources, also called seismic vibrators, are used to impart vibratory seismic energy into the earth. An example of such a seismic vibrator has been described in U.S. Pat. No. 4,184,144.

Since seismic vibrators are known in the prior art, they will not be described in detail. Generally, it can be said that a vibrator has a piston affixed to a coaxial piston rod. The piston is located in a cylinder formed within a heavy reaction mass. Means are included for alternately introducing hydraulic fluid under high pressure to opposite ends of the cylinder, thereby imparting a motion to the piston relative to the reaction mass. These means are actuated by a pilot signal and may, for example, comprise a power valve, a pilot valve, a pump, a torque motor, etc. The piston rod extending from the reaction mass is rigidly coupled to a ground coupling (also called base plate) which is maintained in contact with the ground. The inertia of the reaction mass tends to resist displacement of the reaction mass relative to the earth. The piston motion is coupled through the piston rod and base plate to impart vibratory seismic energy into the earth.

Several ways of mounting a vibrator exist. One example of a suitable mounting is vehicle mounting. When a vibrator containing vehicle has arrived at a selected location, the base plate is lowered into contact with the ground and to prevent decoupling of the base plate from the ground during operation, a portion of the vehicle's weight is applied to the base plate. The vehicle's weight is applied to the base plate through spring members in such a way that a static bias force is imposed on the base plate, while the dynamic forces of the base plate are decoupled from the vehicle.

The vibrator can be driven in any suitable way as is well known to those skilled in the art and thus will not be described in detail.

Generally, it can be said that the force exerted on the earth surface by the base plate of the vibrator, the co-called ground-force, determines seismic phenomena occurring at a large distance from the vibrator. In other words, the ground-force can be considered as an output signal of the seismic vibrator.

In order to be able to derive desirable information about the ground-force such as amplitude- and phase-spectra, it is necessary to measure accurately the actual ground-force of the seismic vibrator. Conventional methods for determining the ground-force of a seismic vibrator have been based upon determining the masses and accelerations of the reaction mass and base plate construction respectively, and deriving from these quantities the ground-force of the seismic vibrator by assuming a balance of forces:

$$F\ \text{ground} = -M_m \cdot a - M_{bp} \cdot a_{bp}$$

in which
$M_m$ = mass of reaction mass
$a_m$ = acceleration of reaction mass (positive sign, if directed towards the earth surface)
$M_{bp}$ = mass of base plate
$a_{bp}$ = acceleration of base plate (positive sign, if directed towards the earth surface)

However, from experiments it appeared that the ground-force derived in the above manner could not be considered as a correct representation of the acutual ground-force imparted to the earth surface since the above methods for determining the ground-force from the balance of forces assume that the base plate is a rigid base plate. However, it appears that such an assumption is not always correct.

Base plate bending causes parts of the base plate to move with different accelerations. To compensate for this phenomenon an effective base plate acceleration should be defined that differs from the acceleration at a particular point, or an effective base plate mass should be used that is different from the true base plate mass. Another cause for the above discrepancy is the force loss through isolation bags used for decoupling the vehicle from the baseplate.

These and other limitations and disadvantages of the prior art are overcome by the present invention, however, an improved apparatus is provided for measuring the force which is actually exerted by the base plate of a seismic vibrator on the earth surface.

SUMMARY OF THE INVENTION

In a preferred embodiment of the present invention a plurality of individual sensor elements are arranged on the side of the baseplate directed towards the earth surface which are used to measure the actual forces exerted on the earth by the baseplate.

The invention will now be described by way of example in more detail with reference to the accompanying drawings.

BRIEF DESCRIPTION OF THE DRAWINGS

FIG. 2 depicts a portion of the embodiment of FIG. 1.

FIG. 3 depicts a side view of a portion of FIG. 2.

DETAILED DESCRIPTION OF PREFERRED EMBODIMENTS

Figure 1:
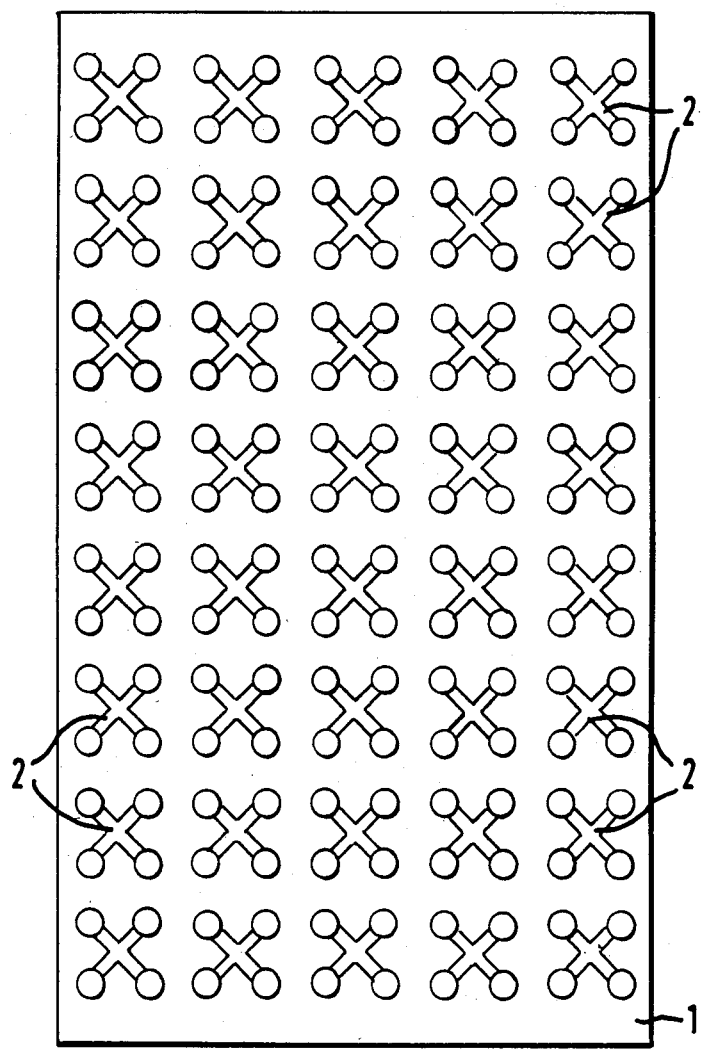
FIG. 1 depicts one embodiment of the present invention.

Referring now to FIG. 1 there may seen a base plate of a seismic vibrator having a side 1 which, in use, is directed towards the earth surface. As discussed hereinbefore, the operation of seismic vibrators as such is known and will not be described in detail. Side 1 of the rectangular base plate has a plurality of individual sensor elements 2 mounted in a regular manner on the surface of side 1. The arrangement of the sensor elements 2 on the base plate is such that the force generated by the vibrator is imparted to the ground only through the sensor elements, and not through any other contact points between base plate and ground. In FIG. 1, a matrix of 8×5 piezoelectric sensor elements 2 has been shown. The sensors may be connected mechanically to the base plate by any suitable means. The operation of piezoelectric elements as such is also known to those skilled in the art and will not be described in detail. In the example of FIG. 1, the length of the side 1 is about 2 meters and its width is about 1 meter. For reasons of clarity no electrical and mechanical connections of the base plate to the seismic vibrator have been represented.

FIG. 2 depicts a sensor element 2 having a cross-shaped mounting plate 3 of any material suitable for the purpose, for example, but not limited to, epoxy glass fiber with a copper layer on both its sides. The mounting plate 3 has a plurality of discs 4 of piezoelectric material. The discs 4 are arranged on the side of the mounting plate, which, in use, is directed towards the earth surface.

In a practical embodiment the distance A–B is about 10 cm. For this embodiment four discs 4 of piezoelectric material are provided on the mounting plate 3, one disc at each end of the cross-shaped mounting plate.

An electric connecting cable 5 for the piezoelectric discs may be connected to the opposite side of the mounting plate 3. For reasons of clarity, only part of the electric cable 5 has been shown. The mounting plate 3 and the discs 4 are embedded in a suitable cast mass 6, for example, but not limited to, reinforced epoxy resin.

FIG. 3 shows a cross-section of the sensor element 2 along the line I—I' of FIG. 2.

Further, electrical connections 7 of the piezoelectric discs 4 have been shown only partially for reasons of clarity.

It will be appreciated that any suitable number of sensors 2 can be used, provided that the arrangement of the sensors is such that all vibrator force is imparted from the base plate only through the sensors into the earth surface. Particularly suitable embodiments of the invention comprise 20–80 sensors. It will also be appreciated that in accordance with the present invention any shape and dimensions of the base plate and sensors may be used. In an advantageous embodiment of the invention the sensors are "sandwiched" between two support plates.

Many other variations and modifications may be made in the apparatus and techniques hereinbefore described, both by those having experience in this technology, without departing from the concept of the present invention. Accordingly, it should be clearly understood that the apparatus and methods depicted in the accompanying drawings and referred to in the foregoing description are illustrative only and are not intended as limitations on the scope of the invention.

What is claimed is:

1. Apparatus for measuring the force exerted on the earth surface by a base plate of a seismic vibrator, comprising:
a plurality of individual sensor elements attached to said base plate and disposed between said base plate and said earth surface to directly couple and measure the energy actually imparted from said base plate into said earth surface and to separate said base plate from said earth surface.

2. The apparatus of claim 1 wherein said plurality comprises 20–80 sensor elements.

3. The apparatus of claim 2 wherein said plurality comprises 40 sensor elements.

4. The apparatus of claim 1 wherein said sensor elements are arranged on a rectangular base plate.

5. The apparatus of claim 4 wherein said base plate has a length of about 2 meters and a width of about 1 meter.

6. The apparatus of claim 5 wherein said sensor elements are arranged in a 8×5 matrix.

7. The apparatus of claim 1 wherein each sensor element comprises a mounting plate provided with piezoelectric material.

8. Apparatus for measuring the force exerted by a base plate of a seismic vibrator on the earth surface, comprising:
a plurality of individual sensor elements, wherein each such sensor element comprises a cross-shaped mounting plate provided with piezoelectric material, attached to said base plate and disposed to couple energy from said base plate into said earth surface.

9. The apparatus of claim 8 wherein said cross-shaped mounting plate is provided at its ends with discs of piezoelectric material.

10. The apparatus of claim 7 wherein said mounting plate comprises epoxy glass fiber.

11. The apparatus of claim 7 wherein said mounting plate comprises a copper layer on both its sides.

12. The apparatus of claim 9 wherein said mounting plate and discs are embedded in epoxy resin.

* * * * *